United States Patent Office 3,413,380
Patented Nov. 26, 1968

3,413,380
REACTION PRODUCT OF AN AMMONIA/
PHOSPHORUS PENTOXIDE CONDENSATE
WITH AN AMINE OR HYDROXY COMPOUND AND PROCESS
Edward W. Snyder, Iselin, N.J., assignor to Union Carbide Corporation, a corporation of New York
No Drawing. Filed Dec. 18, 1964, Ser. No. 419,602
17 Claims. (Cl. 260—920)

ABSTRACT OF THE DISCLOSURE

Flame retardant adducts for synthetic resins are prepared by reacting an ammonia/phosphorus pentoxide condensation product with a functional compound of the formula R—[Q(H)$_n$]$_m$ wherein R is a hydrocarbon moiety having from 1 to 30 carbon atoms and Q is an atom having an atomic weight from 13.8 to 16.1 and $n$ is a value of 1 or 2. Illustrative of the functional compounds are hydroxyl and amino hydrocarbons such as alcohols, phenols, polyols, amines and the like.

---

The present invention relates to flame retardant additives for synthetic resin compositions. More particularly, this invention relates to novel phosphorus containing flame retardants which exhibit improved compatibility characteristics.

It has been found that condensates of ammonia (NH$_3$) and phosphorus pentoxide (P$_2$O$_5$) provide excellent flame retardance to synthetic resin compositions. Unfortunately, these condensates which are solids, are not always soluble in or compatible with many synthetic resin compositions. This has been especially true when these condensates are used in aqueous resin compositions such as phenolic resin coatings solutions, synthetic resin latexes, and the like. In the case of phenolic resin solutions the presence of these condensates for example causes two phases to develop. This immiscibility can sometimes be overcome through the addition of large amounts of water, but the inherent deficiencies in the presence of large quantities of water makes this solution to the problem impractical. Unfortunately these condensates are thereby limited in their use. This is especially true in phenolic resin compositions such as laminating varnish compositions where large amounts of water are not tolerable.

In accordance with this invention it has been found that flame retardants exhibiting enhanced compatibility with synthetic resin are provided by modifying the reaction products of ammonia/phosphorus pentoxide condensates. These modified condensates are prepared by reacting the ammonia/phosphorus pentoxide condensates with a hydrocarbon having as a functional substituent —Q(H)$_n$ wherein Q represents an atom having an atomic weight of from 13.8 to 16.1, H is a reactive hydrogen substituent and $n$ is an integer having a value of from 1 to 2 inclusive and is equal to the valence of Q-1. Illustrative of functional substituents represented by —Q(H)$_n$ are hydroxyl substituents (OH) and amino substituents (—NH$_2$).

By the term ammonia/phosphorus pentoxide condensate is meant those reaction products which are produced by heating phosphorus pentoxide and an excess of ammonia at temperatures in excess of 100° C. Preparation and description of these condensates is disclosed in U.S. Patent 2,122,122, patented on June 28, 1938, in the name of Willard H. Woodstock, which is hereby incorporated by reference.

While the nature of the reaction between ammonia and phosphorus pentoxide is not completely understood it is postulated that upon heating at a temperature above 100° C. a product is formed having the formula:

I

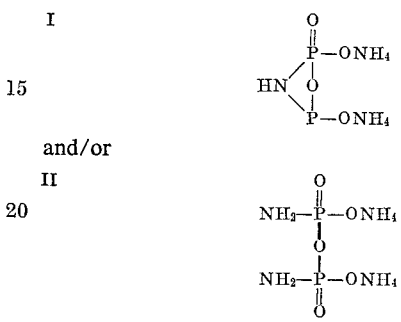

and/or

II

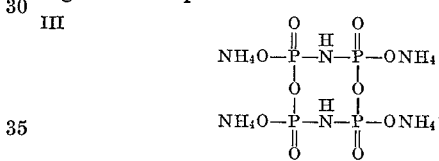

when this product is heated at a temperature in excess of 150° C. for an appreciable period of time ammonia gas is evolved and a product is formed for which the following formula is postulated:

III $$\begin{array}{c} \text{O} \quad\quad \text{O} \\ \| \quad \text{H} \quad \| \\ \text{NH}_4\text{O—P—N—P—ONH}_4 \\ | \quad\quad | \\ \text{O} \quad\quad \text{O} \\ | \quad \text{H} \quad | \\ \text{NH}_4\text{O—P—N—P—ONH}_4 \\ \| \quad\quad \| \\ \text{O} \quad\quad \text{O} \end{array}$$

When phosphorus pentoxide is heated with ammonia at temperatures of about 100° C. for a period of time sufficient to produce condensation, and then this condensate mixture is heated to a temperature above 150° C. for an appreciable period i.e., from 30 mintues to 6 hours, the product can well be a mixture of compounds as represented by Formulae I–III above.

Preferably, heating at a temperature of above 150° C. is continued until the ratio of nitrogen to phosphorus is less than 1.5 to 1, and more preferably not greater than 1.25 to 1. These condensates generally have a nitrogen to phosphorus ratio of from 0.90 to 1 to 1.5 to 1.

The hydrocarbon compounds having as a functional substituent at least one —Q(H)$_n$ group as defined above can be expressed by the formula R—[Q(H)$_n$]$_m$ wherein R is a hydrocarbon moiety containing from 1 to 30 carbon atoms inclusive and $m$ is an integer having a value of from 1 to 8 inclusive.

While as indicated above, R is a hydrocarbon substituted by $m$ —Q(H)$_n$ substituents it is preferable that $m$ be no larger than the number of carbon atoms in R. Thus, for example, when R is methane, $m$ is preferably 1, ethane 2, and the like. Considering therefore, R to be a hydrocarbon containing $m$ substituents —Q(H)$_n$, illustrative representations of R are set forth as hydrocarbon bases from which the radicals are derived by the removal of hydrogen atoms.

Therefore, illustrative of the hydrocarbon bases of the R moiety are the aliphatic hydrocarbons containing from 1 to 30 carbon atoms inclusive and preferably 1–12 carbon atoms inclusive such as methane, ethane, propane, butane, pentane, hexane, heptane, octane, nonane, decane, undecane, dodecane, pentadecane, octadecane, cosane, pentacosane, tricontane and the like; while olefinic and acetylenic hydrocarbon bases can be used, then high reactivity makes them less desirable, as hydrocarbon moieties;

The cycloaliphatic hydrocarbons containing from 3 to 30 and preferably from 3 to 12 carbon atoms inclusive such as cyclopropane, cyclobutane, cyclopentane, cyclohexane, cycloheptane, cyclooctane, dicyclohexyl, and the like;

The aromatic hydrocarbon moieties containing from 6 to 30 and preferably from 6 to 12 carbon atoms inclusive such as benzene, toluene, biphenyl, diphenylpropane, naphthyl, and the like.

Also included within the scope of the modifying agents $R-(Q(H)_n)_m$ are those ether or amine compounds which are formed by the condensation of two or more compounds having the formula $Q(H)_n-R-Q(H)_n$, i.e., $R[Q(H)_n]_m$ where $m=2$.

Illustrative of the modifying compounds which are used in this invention are the aliphatic alcohols such as methanol, ethanol, propanol, butanol, hexanol, decanol, dodecanol, pentadecanol, cosanol, tricontanol and the like.

Aliphatic polyols such as ethylene glycol, propylene glycol, butane diol, pentane diol, decane diol, dodecane diol, pentadecene diol, cosane diol, tricontane triol, propane triol, decane tetraol, dodecane hexol, and the like.

The aliphatic amines such as methyl amine, ethyl amine, propyl amine, butyl amine, pentyl amine, hexyl amine, decyl amine, cosyl amine, tricontyl amine, and the like;

The aliphatic polyamines such as ethylene diamine, propylene diamine, propylene triamine, hexamethylene diamine, decane tetramine, cosane pentamine, tricontane hexamine, and the like;

The aliphatic amino alcohols such as ethanol amine, butanol amine, propanol amine, hexanol amine, dodecanol amine, tetrahydroxyl tetramino, tricontane amine, and the like;

The cycloaliphatic alcohols such as cyclopropanol, cyclobutane diol, cyclopentane diol, cyclohexanol, cyclohexane diol, inositol, and the like;

The cycloaliphatic amines such as cyclohexyl amine, cyclohexylene diamine, bis(aminohexyl)cyclohexane, and the like;

The aromatic alcohols and amines such as benzyl alcohol, benzyl amines, bis(aminophenyl)propane, and the like;

The ether diols such as diethylene glycol, triethylene glycol, and the like;

The amino aliphatic amines include diethylene triamine, triethylene tetramine, bis(hexamethylene)triamine, and the like.

The particular modifying agent used is to a great extent dictated by the use the flame retardant is to be put. For example, when the adduct is to be used in an aqueous system, it is desirable to use an aliphatic polyol or polyamine modifying agent having less than ten carbon atoms.

Exceptional compounds for such systems are ethylene glycol, triethylene glycol, ethylene diamine, and ethanol amine.

Where the compound is to be used in a nonaqueous system for example, in a polymer melt the characteristics of the polymer will determine the modifying agent to be used, for example, in polyethylene the modifying compounds are desirably long chained aliphatic mono-amines or alcohols.

Where the resin system is reactive to amine groups (as in epoxides) or hydroxyl groups as in polyurethanes then it can be desirable to provide such groups in excess as substituents on the modifying agent. In such cases the modifying agent can become incorporated into the polymer system.

The improved flame retardant composition of the present invention is prepared by thermally reacting the ammonia/phosphorus pentoxide condensate described above, with the modifying agent for a sufficient period of time to insure complete reaction and thereafter recovering the product.

This reaction is conducted at a temperature of from 140° C. to 220° C. when an alcoholic adduct, such as an alkanol or alkane polyol, is prepared and preferably from 170° to 200° C. However, when an amine compound such as an alkyl amine, alkane polyamine or amino alkanol is prepared temperatures of from 60° C. to 220° C. and preferably from 80° to 120° C. can be used. This reaction temperature is generally maintained for a period sufficient to effect reaction. This period is generally greater than 10 minutes and is preferably from 1 to 6 hours. It should be noted that the temperatures given are for unmodified reactions at normal times. When catalytic agents are used or extended reaction periods are used the reactions can be effected at lower temperatures.

The reaction can be conducted at atmospheric or subatmospheric pressure. The reaction environment however should be preferably maintained under relatively anhydrous conditions, when the reaction is alcoholic in nature. Amines and amino alcohols can be readily prepared under either hydrous or anhydrous conditions. While superatmospheric pressures are to be avoided because they diminish the evolution of ammonia gas during the reaction, slightly elevated pressures can be used. Subatmospheric pressures increase the evolution of ammonia and thereby increase the reaction rate.

The reactants are generally charged to the reaction in a ratio of from 1:1 to 1:6 parts by weight ammonia/phosphorus pentoxide condensate to modifying agent. However, it has been found desirable to react these ingredients in an excess of modifying agent to insure complete reaction and for this reason it is preferred to use the reactants in a ratio of from 1:1.25 to 1:2.0.

The reaction product is recovered directly from the reaction vessel by decantation.

In a typical preparation of a flame retardant of this invention 100 parts of ammonia/phosphorus pentoxide condensation product having a nitrogen phosphorus ratio of less than about 1.5 to 1, and 125 parts of ethylene glycol are charged to a reaction vessel fitted with a calcium chloride column. The reaction vessel is heated until the reaction mixture attains a temperature of 170° C. This temperature is maintained for a period of about one hour after which period the reaction is cooled and the reaction mixture is decanted from the reaction vessel. During the reaction period ammonia ($NH_3$) is removed from reaction in an amount greater than about 3.3 parts by weight per hundred parts by weight of ammonia/phosphorus pentoxide condensate in the reaction.

While the flame retardant compositions of the present invention can be used in any resin systems particularly those systems which are soluble or dispersible in polar solvents, these compositions are especially effective and desirable in phenolic resin systems.

The phenolic resin component of such systems as contempated herein are the condensation products of a phenol with an aldehyde. Such condensation products are divided into two classes: resoles and novolaks. These two types of resins are discussed in order below.

RESOLE RESINS

Resole resins, are produced by the condensation of phenols and aldehydes, usually under alkaline conditions. Resoles differ from novolaks in that polynuclear methylol-substituted phenols are formed as intermediates in resoles. A resole produced by the condensation of phenol with formaldehyde most likely proceeds through an intermediate having the following illustrated type structure:

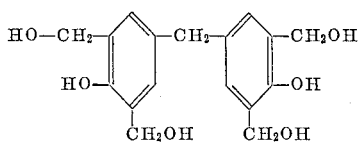

In a typical synthesis, resoles are prepared by heating one mole of phenol with 1.5 moles of formaldehyde under alkaline conditions.

The resole resins are prepared by the condensation of phenol with formaldehyde or, more generally, by the reaction of a phenolic compound, having two or three reactive aromatic ring hydrogen positions, with an aldehyde or aldehyde-liberating compound capable of undergoing phenol-aldehyde condensation. Illustrative of phenolic compounds are cresol, xylenol, ethylphenol, butylphenol, isopropylmethoxyphenol, chlorophenol, resorcinol, hydroquinone, naphthol 2,2-bis(p-hydroxyphenyl)propane, and the like. Illustrative of aldehydes are formaldehyde, acetaldehyde, acrolein, crotonaldehyde, furfural, and the like. Illustrative of aldehyde-liberating compounds are hexamethylene-tetramine and 1,3,5-trioxane. Ketones such as acetone are also capable of condensing with the phenolic compounds.

The condensation of phenolic compound and aldehyde is conducted in the presence of alkaline reagents such as sodium carbonate, sodium acetate, sodium hydroxide, ammonium hydroxide, and the like. When the condensation reaction is completed, if desired the water and other volatile materials can be removed by distillation, and the catalyst neutralized.

NOVOLAK RESINS

The novalak resins are prepared in a manner similar to that used to prepare the resole resins. The distinguishing exception in this preparation is however that the reaction is usually conducted in an acidic media, instead of an alkaline media as is the case with the resoles. When less than six moles of formaldehyde are used per seven moles of phenol the products are permanently fusible and soluble. These are the novolak resins. The novolaks have a different structure than the resoles as is illustrated by the novolak condensation products of phenol with formaldehyde:

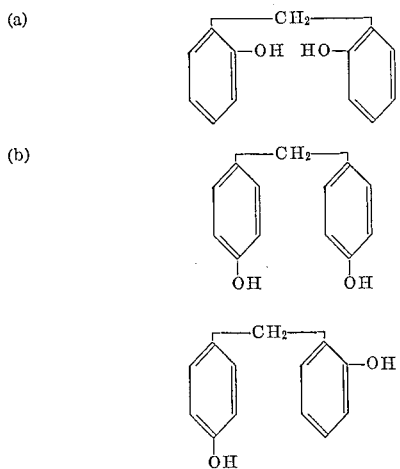

The novolaks can be further reacted with formaldehyde or with a compound such as hexamethylene tetramine, to a state of cure which is similar in nature to the curing pattern of the resoles.

In a typical synthesis novolaks are prepared by heating one mole of phenol with 0.5 mole of formaldehyde under acidic conditions. The temperature at which the reaction is conducted is generally from about 25° C. to about 175° C.

The reactants which can be used in the preparation of the novolaks are the same as those used in the preparation of the resoles which are described and listed above.

While as previously stated both the resole resins and the novolak resins can be employed in the compositions of the present invention, it is preferred to use the resole resins, as these are one-step cured resins.

It should, however, be noted that when the glycol adduct is used with resole phenolic resins, the curing reaction of the mixture effects a decrease in pH. In order to raise the pH during curing it has been found desirable to add abase such as hexamethylenetetramine or a nonvolatile inorganic hydroxide such as sodium hydroxide. It has been found preferable to use hexamethylenetetramine for this purpose. This compound can be added to the phenolic solution or it can be formed in situ during the formation of the condensate-glycol adduct by adding formaldehyde or paraform to the glycol-condensate reaction mixture. The hexamethylenetetramine is formed through the reaction of formaldehyde and the ammonia evolved during the formation of the glycol adduct. This amine serves both to reduce acidity and enhance curing of the phenolic resin. When an amine adduct is used it is not generally necessary to raise the pH of the composition.

The most suitable resole resins are those which are soluble in water and alcohols such as methanol, ethanol, and the like, and water alcohol mixtures.

Mixtures of phenolic resins can be used in the composition of the present invention as well as mixtures of phenolic resins and other synthetic resins.

It is to be understood that the completely cured resins as typified by the C-stage resins cannot be used in the preparation of the compositions of the present invention as they are not solvent soluble and cannot be incorporated into the other ingredients. The resins which can be used are those which are solvent soluble and which permit admixture. It might be noted, however, that the solvent insoluble, infusible phenolic resins are present in the phenolic resin compositions after curing so that while these resins cannot be used to prepare the compositions they are ultimately present in the cured resins.

The phenolic compositions of this invention have been found to be especially useful in the preparation of phenolic foams. These foams can be prepared merely by heating until the composition froths or can be blown with conventional blowing agents such as the freon gases, methylene chloride, isopropyl ether, etc.

It should be noted that various additives can be used in the compositions of the present invention. Such additives include fillers such as wood flours, mineral fillers such as calcium carbonate, magnesium oxide, zinc oxide, magnesium carbonate, asbestos, glass, mica, and the like; antioxidants such as hydroquinone, ditertiary butyl para cresol, tertiary butyl catechol; and catalysts such as polyamines, alkaline oxides and the like; diluents such as alcohols, water and the like; and colorants such as dyes, pigments, and the like.

The flame retardant compositions can be effectively applied to synthetic resins by mixing solutions of the resin with the flame retardants, by incorporation of the retardants into a hot melt or by coating particles of the resin with the retardant.

While the flame retardant adduct of this invention is especially suitable for phenolic resins, it can be applied effectively to other resins such as polyesters, polyepoxides, polyureas, polyurethanes, vinyl polymers, olefin polymers, melamines, and the like. The thermosetting resins are preferred.

The flame retardants of the present invention are generally added to synthetic resin compositions in amounts of from 5 to 100 parts adduct solids by weight per 100 parts synthetic resin solids, depending on the application and degree of flame resistance desired. It has been found preferred however to use from 45 to 70 parts solids by weight per hundred parts synthetic resin solids.

It should be noted that the flame retardants of the present compositions are particularly useful in phenolic laminating varnishes. These varnishes generally comprise a heat curable phenolic resin with such additives as organic solvents where desired, and the like. In such use the amino alkanol adducts of the ammonium/phosphorus pentoxide condensate are preferred as these agents are particularly compatible with phenolic resin compositions having a high resin content. Of the alkanol amine adducts ethanol amine is preferred as these adducts exhibit exceptional compatibility and flame retardant properties.

Solids content of both resin and adduct are determined by evaporation in oven at 135° C. for a period of 3 hours. The above proportions are based on solids.

In the examples which follow and throughout this specification all parts and percentages are by weight unless otherwise indicated.

Example I.—Preparation of flame retardant utilizing ethylene glycol as the polyol reactant One hundred parts of an ammonia/phosphorus pentoxide condensate having a nitrogen to phosphorus ratio of less than 1.5:1 were charged to a one-liter flask. 125 parts of ethylene glycol were then added.

The flask was then heated to a temperature of 170° C. and this temperature was maintained for one hour. During this reaction period approximately 3.3 parts of ammonia was evolved from the reaction. After the reaction period the flask was cooled and the reaction mixture was decanted from the flask as a highly viscous liquid. About 28 parts of water was then added to the reaction mixture to reduce the viscosity and this aqueous solution was filtered. Solids content of the filtrate as determined by evaporation at 135° C. for three hours was 63 percent.

Example II

In a manner similar to that described in Example I glycol adducts of the reaction product of phosphorus pentoxide and ammonia were prepared using (1) Propylene glycol, and
(2) Triethylene glycol.

The reactants were charged in a ratio of 1 part phosphorus pentoxide-ammonia adduct to 1.25 parts glycol.

(1) The reaction containing propylene glycol was heated to a temperature of from 165° C. to 170° C. and maintained at this temperature for about one hour. The product yield was 220.6 grams. To the reaction mixture was added 28.3 parts of ethanol. The viscosity of this mixture was about 15,000 centipoises. The pH of the mixture was about 5.5. The reaction mixture was clear.

(2) The reaction containing triethylene glycol was heated to a temperature of about 200° C. and maintained at this temperature for about one hour. The reaction product yield was 217.9 grams. To this reaction mixture was added 32.1 parts of water. The viscosity of this solvent mixture was greater than 15,000 centipoises. The pH of the mixture was 5.0. The reaction mixture was clear.

The glycerine adduct is prepared in a similar manner.

Example III.—Preparation of phenolic compositions containing flame retardants

The phenolic resin used in this example was typical of the class of resole phenolic resins. It was prepared by reacting 100 parts by weight phenol and 128.5 parts by weight of 37% aqueous formaldehyde solution in the presence of 8.21 parts by weight of 25 percent aqueous sodium hydroxide solution. This reaction was conducted in a still at a temperature of 60° C. This reaction temperature was maintained for a period of four hours. At the end of this reaction period the resin was vacuum dehydrated to remove 65 parts of distillate per 100 parts of phenol. The resin was then cooled and recovered directly from the still. The liquid phenolic resin yield was 170 parts by weight per 100 parts by weight of phenol used. The solids content was 68.0.

This phenolic resin was then modified by the addition of 85 parts by weight of the ethylene glycol-ammonium salt of amide polyphosphate adduct as prepared in Example I above. This modified phenolic resin was a clear solution, being amber in color.

In order to evaluate the flame resistance of the modified phenolic resin, heavy air permeable filter paper was impregnated with the modified phenolic resin. The resin was thermally cured and then directly exposed to the flame of a burner for a period of 10 seconds. The paper did not ignite in this period. Similar papers impregnated with unmodified phenolic ignited quite readily in this time.

These and similar evaluations demonstrate that papers impregnated with modified resin solutions to a resin content as low as 20 percent were rendered flame resistant as the cured sheet. Papers impregnated to a modified resin content of 28 percent and cured were demonstrated to retain their flame resistant characteristics after boiling for 15 minutes in water and drying.

Example IV.—Monoethanolamine adduct of phosphorus pentoxide/ammonia condensate

Two hundred parts of water, one hundred parts of monoethanolamine, and one hundred parts of phosphorus pentoxide/ammonia condensate are charged to a twelve liter stainless steel still fitted with agitator, thermometer, and water-cooled condensers. The charge is heated to 80° C. under atmospheric reflux conditions. At a temperature of about 80° C., the evolution of ammonia commences and heating is continued for a period of 15 minutes. During this 15-minute period, the temperature slowly rises to about 95–100° C. and the evolution of ammonia is gradually reduced to a minimum. After 15 minutes' reaction at 80–99° C., the reaction product is vacuum dehydrated to remove 150 parts of distillate reducing the net yield to 250 parts. The dehydrated product is then cooled and discharged. Typical final properties are as follows:

| | |
|---|---|
| Viscosity (cst.) | 210 |
| pH | 10.05 |
| Percent solids (3 hours at 135° C.) | 70.0 |

The final product obtained using the foregoing formulation and procedure is clear and miscible with water or a mixture of ethanol and water. When the product is mixed with phenolic resin, the mixture remains clear and is stable. Flame resistance is good, but slightly lower than the glycol adduct.

Examples V–XVII

Using equipment similar to that described above, a series of experimental batches were prepared, wherein formulations and conditions were varied and other amines were utilized. Data pertinent to each of these is set forth in Table I showing formulations, conditions of reaction and results. Although not shown in Table I, it should be noted that the reaction can also be carried out in the absence of water. Agitation without water however is difficult and the use of water eliminates this difficulty. It should also be noted that subsequent to the initial reaction, free amine can be neutralized with acids such as sulfamic acid, phosphoric acid, and the like. The use of the acids indicated also improves the effectiveness of the product as a flame retardant.

TABLE I

| | Example No. | | | | | | | | | | | | |
|---|---|---|---|---|---|---|---|---|---|---|---|---|---|
| | 5 | 6 | 7 | 8 | 8 | 10 | 11 | 12 | 13 | 14 | 15 | 16 | 17 |
| | Amine Used | | | | | | | | | | | | |
| | MEA | MEA | MEA | MEA | MEA | MEA | DEA | DETA | TEA | EDA | 2-Al-B | T-BA | CHA |
| Formulation: | | | | | | | | | | | | | |
| Parts amine | 50 | 100 | 125 | 100 | 100 | 125 | 100 | 100 | 100 | 100 | 100 | 100 | 100 |
| Parts water | 200 | 200 | 200 | 100 | 200 | | 200 | 200 | 200 | 200 | 200 | 200 | 200 |
| Parts ethylene glycol | | | | | | 125 | | | | | | | |
| Parts $P_2O_5/NH_3$ condensate | 100 | 100 | 100 | 100 | 100 | 100 | 100 | 100 | 100 | 100 | 100 | 100 | 100 |
| Reaction: | | | | | | | | | | | | | |
| °C. Temp | 80–95 | 80–95 | 80–95 | 80–95 | 170 | 170 | 80–95 | 80–95 | 80–95 | 80–95 | 80–95 | 60–67 | 80–95 |
| Mins | 15 | 15 | 15 | 15 | 60 | 60 | 15 | 15 | 15 | 15 | 15 | 15 | 15 |
| Condition [1] | AR | AR | AR | AR | AD | AD | AR | AR | AR | AR | AR | AR | AR |
| Vac. Dehydration [2] | X | X | X | X | None | None | X | X | X | X | X | X | X |
| Yield After Dehy (parts) | 250 | 250 | 250 | 250 | 187 | 326 | 250 | 250 | 250 | 250 | 250 | 250 | 250 |
| Water Added (parts) | | | | | 63 | 8 | | | | | | | |
| Final Yield | 250 | 250 | 250 | 250 | 250 | 334 | 250 | 250 | 250 | 250 | 250 | 250 | 250 |
| Final Properties: | | | | | | | | | | | | | |
| (CST) Visc | 26 | 209 | 2,324 | 243 | 642 | 16,000 | 830 | 5,734 | 793 | 429 | 862 | 92.2 | 850 |
| pH | 7.70 | 10.05 | 10.35 | 10.05 | 6.35 | 9.30 | 8.30 | 10.65 | 7.95 | 11.20 | 8.60 | 6.70 | 8.00 |
| Solids | 61.5 | 69.9 | 75.5 | 70.2 | 70.2 | 67.3 | 76.8 | 74.2 | 78.6 | 61.3 | 72.3 | 55.1 | 73.2 |
| Clarity | Cl | Cl | Cl | Cl | Hazy | Cl | Cl | Cl | Cl | Cl | Cl | Hazy | Cldy |
| Solvent Miscibility [3] | | | | | | | | | | | | | |
| Water | G | G | G | G | G | G | G | G | G | G | G | G | G |
| Ethanol | P | P | P | P | P | P | P | P | P | P | P | G | P |
| 1:1 Ethanol:Water | P | G | G | G | G | P | G | P | G | P | G | G | G |
| Resin/Adduct Mix: | | | | | | | | | | | | | |
| Parts BLLA-1105 | 100 | 100 | 100 | 100 | 100 | 100 | 100 | 100 | 100 | 100 | 100 | 100 | 100 |
| Parts adduct | 50 | 50 | 50 | 50 | 50 | 68.7 | 50 | 50 | 50 | 50 | 50 | 50 | 50 |
| Compatibility [4] | P | G | G | G | G | G | G | G | P | P | G | G | G |
| Properties: | | | | | | | | | | | | | |
| pH | 8.15 | 8.60 | 8.70 | 8.65 | 8.90 | 6.35 | 7.90 | 8.90 | 7.60 | 9.15 | 8.05 | 8.00 | 8.15 |
| (Sec) Gel at 160° C | 111 | 140 | 179 | 141 | 143 | 234 | 131 | 102 | 112 | 122 | 141 | 112 | 118 |
| Solids | 65.2 | 71.4 | 63.3 | 71.2 | 68.9 | 75.5 | 72.5 | 72.1 | 70.8 | 69.0 | 69.8 | 64.8 | 70.1 |

[1] Reaction Condition, AR=Atmos Reflux AD=Atmos Dehydration.  [2] All were Vac dehydrated except where noted.  [3] Solvent Miscibility G=Good, P=Poor.  [4] Resin Compatibility G=Good, P=Poor.
Amines: MEA=Monoethanolamine; DEA=Diethanolamine; DETA=Diethylene Triamine; TEA=Triethanolamine; EDA=Ethylene Diamine; 2-Al-B=2-Amino 1-Butanol; T-BA=Tert Butylamine; CHA=Cyclohexylamine.

Examples XVIII–XXII

Two hundred grams of water, one hundred grams of the amine, and one hundred grams of Victamide were charged to the beaker. Beaker was placed on the hot plate and heated with occasional stirring. Vapor was allowed to escape in the atmosphere and heating was continued until net yield was reduced to 250 grams. At this point in most cases, temperature had risen to 110–115° C. The reaction product was then cooled. It was particularly notable in these experiments that reaction, as evidenced by severe bubbling with evolution of ammonia, took place at approximately 60–80° C. Where such amines as aniline and diphenylamine were utilized, there was no such evidence of reaction even at higher temperatures.

Using the beaker charge and procedure just described reactions were evident where the following amines were utilized.

*Triethylene tetramine.*—This amine produced a final product which was clear, both hot and cold. Viscosity was approximately 1500–2000 cst., pH was 10.15 and solids content 55.7%. The final product was miscible with water but not with ethanol. It showed good compatibility with the phenolic resin.

*Tetraethylene pentamine.*—This amine produced a final product which was clear, both hot and cold. Viscosity was approximately 30–40,000 cst., pH was 9.15 and solids content 79.7%. The product was miscible with water but not ethanol, and showed good compatibility with the phenolic resin.

*Benzylamine.*—This amine produced a product which was clear when hot, but was a white waxy paste when cold. pH was shown to be 8.0 and solids content 79.1%. The product was not soluble in ethanol and only partially soluble in water. Its compatibility with phenolic resin was poor. This reaction product has potential as a flame retardant coating from aromatic solvents.

*Dodecylamine.*—This reaction very quickly became insoluble in water with little heat. The product, separated from the water, was a white wax-like solid, insoluble in water or any of the usual solvents. The wax-like substance showed a solids content of 95.1% and could not be dissolved in the phenolic resin. This reaction product has potential as a nonleachable flame retardant.

*Bis(hexamethylene)triamine.*—This reaction product was hazy when hot, and became a greasy substance when cold. Its pH was 9.7 and solids content was 74.3%. When mixed with phenolic resin, the mixture was hazy, but cleared with slight heating and remained clear when subsequently cooled.

Example XXIII.—Evaluation of condensate adducts as flame retardants in phenolic foam A phenol-formaldehyde resin composition was prepared containing various flame retardants of this invention. The formulation of these compositions is set forth in Table II below.

Foam slabs, one half inch thick were prepared from these compositions. Each slab was placed on a ring stand over a Bunsen burner. The burn through time in minutes was used as an indication of flame retardancy. The results of these evaluations are shown in Table II below.

TABLE II.—EFFECT OF ADDUCTS ON FLAMMABILITY OF PHENOLIC FOAM

| Ingredients: | | | | | | | | | | |
|---|---|---|---|---|---|---|---|---|---|---|
| Phenol formaldehyde resin | 100 | 100 | 100 | 100 | 100 | 100 | 100 | 100 | 100 | 100 |
| Silicone Lubricant | 3 | 3 | 3 | 3 | 3 | 3 | 3 | 3 | 3 | 3 |
| Blowing Agent | 10 | 10 | 10 | 10 | 10 | 10 | 10 | 10 | 10 | 10 |
| Hcl (37%) | 10 | 10 | 10 | 10 | 10 | 10 | 10 | 10 | | |
| Xylene sulfonic acid | | | | | | | | | 10 | 5 |
| Adduct of Example 6 | | 10 | | | | | | | 10 | |
| Adduct of Example 11 | | | 10 | | | | | | | |
| Adduct of Example 12 | | | | 10 | | | | | | |
| Adduct of Example 13 | | | | | 10 | | | 20 | 30 | |
| Adduct of Example 14 | | | | | | 10 | | | | |
| Foam Core Density, p.c.f. | 2.2 | 2.5 | 2.8 | ([1]) | 3.3 | 4.1 | | 4.1 | 3.1 | 1.4 |
| Burn-Thru min | 2.0 | 14 | 15 | ([1]) | 6.5 | 30+ | 19 | 12 | 30+ | 1.0 |
| pH, Foam ± | 3.6 | 2.5 | 2.4 | | 2.6 | 2.7 | | 2.2 | 2.6 | 2.5 |
| Foam Compressive Strength, p.s.i. | 35 | 28 | 38 | | 50 | 42 | | 32 | 29 | 8 |

[1] No foam.
NOTE.—±5 gms. foam ground in 100 ml $H_2O$.

These evaluations demonstrate the excellent flame retardance provided by the adducts of this invention. The very fact that these adducts evaluated are liquids made blending and handling simpler than the various solid systems.

In a similar manner these adducts can be blended with other resin systems such as epoxide resins, melamine resins, polyurethane resins, and the like to provide good flame retardancy.

While these adducts are particularly suited for use with thermosetting resin compositions it should be noted that they can also be used with thermoplastic compositions such as vinyl resins, olefins, such as polyethylene, polypropylene, polybutadiene, and the like.

When the present flame retardants are used with phenolic laminating varnishes they can be merely blended with the varnish compositions although if desired they can be admixed to the reaction vessel during the resin condensation reaction. Laminating varnishes containing the flame retardants of this invention provide outstanding flame resistance.

What is claimed is:

1. An adduct resulting from reacting at a temperature of from about 60° C. to about 220° C. for a period of time sufficient to cause evolution of ammonia an ammonia/phosphorous pentoxide condensate having a nitrogen to phosphorus ratio of less than 1.5 to 1 with a functional compound of the formula $$R—[Q(H)_n]_m$$

wherein R is a hydrocarbon moiety having from 1 to 30 carbon atoms inclusive, Q is an atom selected from the group consisting of oxygen and nitrogen, H is a reactive hydrogen substituent, $n$ is an integer having a value of from 1 to 2 inclusive, and $m$ is an integer having a value of from 1 to 8 inclusive but no greater than the number of carbon atoms present in R.

2. The adduct of claim 1 wherein when the functional compound contains no amine substituents the reaction is conducted at a temperature of from about 140° C. to about 220° C.

3. The adduct of claim 1 wherein R is a hydrocarbon moiety containing from 1 to 12 carbon atoms inclusive.

4. The adduct of claim 1 wherein R is an aliphatic hydrocarbon moiety containing from 1 to 12 carbon atoms and Q is a nitrogen atom.

5. The adduct of claim 1 wherein the said functional compound is an amino alkanol containing from 1 to 30 carbon atoms inclusive.

6. The adduct of claim 1 wherein the hydrocarbon moiety is a cycloaliphatic hydrocarbon moiety containing from 3 to 12 carbon atoms.

7. The adduct of claim 1 wherein the hydrocarbon moiety is an aromatic hydrocarbon moiety containing from 6 to 12 carbon atoms.

8. The adduct of claim 1 wherein the said functional compound is an alkane polyamine.

9. The adduct of claim 2 wherein R is an aliphatic hydrocarbon moiety containing from 1 to 12 carbon atoms.

10. The adduct of claim 2 wherein the said functional compound is an alkane polyol containing from 1 to 12 carbon atoms.

11. An ethanolamine adduct of an ammonia/phosphorus pentoxide condensate resulting from heating ethanolamine and an ammonia/phosphorus pentoxide thermally formed condensate having a nitrogen to phosphorus ratio of less than 1.5 to 1, to a temperature of from about 80° C. to about 120° C. and maintaining this temperature for a period of time sufficient to cause the evolution of ammonia.

12. An ethylene glycol adduct of an ammonia/phosphorus pentoxide condensate resulting from heating ethylene glycol and an ammonia/phosphorus pentoxide thermally formed condensate having a nitrogen to phosphorus ratio of less than 1.5 to 1, to a temperature of from about 170° C. to about 200° C. and maintaining this temperature for a period of time sufficient to cause the evolution of ammonia.

13. A propylene glycol adduct of an ammonia/phosphorus pentoxide condensate resulting from heating propylene glycol and an ammonia/phosphorus pentoxide thermally formed condensate having a nitrogen to phosphorus ratio of less than 1.5 to 1, to a temperature of from about 170° C. to about 200° C. and maintaining this temperature for a period of time sufficient to cause the evolution of ammonia.

14. A triethylene glycol adduct of an ammonia/phosphorus pentoxide condensate resulting from heating triethylene glycol and an ammonia/phosphorus pentoxide thermally formed condensate having a nitrogen to phosphorus ratio of less than 1.5 to 1, to a temperature of from about 170° C. to about 200° C. and maintaining this temperature for a period of time sufficient to cause the evolution of ammonia.

15. A glycerine adduct of an ammonia/phosphorus pentoxide condensate resulting from heating glycerine and an ammonia/phosphorus pentoxide thermally formed condensate having a nitrogen to phosphorus ratio of less than 1.5 to 1, to a temperature of from about 170° C. to about 200° C. and maintaining this temperature for a period of time sufficient to cause the evolution of ammonia.

16. The method of preparing flame retardant adducts of ammonia/phosphorus pentoxide thermally formed condensates having a nitrogen to phosphorus ratio of less than 1.5 to 1 with a modifying compound of the formula $$R—[Q(H)_n]_m$$

wherein R is a hydrocarbon moiety having from 1 to 30 carbon atoms inclusive, Q is an atom selected from the group consisting of oxygen and nitrogen, H is a reactive hydrogen substituent, $n$ is an integer having a value of from 1 to 2 inclusive, and $m$ is an integer having a value of from 1 to 8 inclusive but no greater than the number of carbon atoms present in R by heating the reaction mixture to a temperature of from about 60° C. to 220° C., maintaining this temperature for a period of time sufficient to cause the evolution of ammonia and thereafter recovering the adduct product, wherein when the said modifying compound contains no amine groups then a reaction temperature of from about 140° C. to about 220° C. is used.

17. The method of claim 16 wherein the modifying compound is used in excess and the reaction is conducted at a temperature of from about 80° C. to about 200° C. for a period of from 1 to 6 hours, with the proviso that when the modifying compound used contains an amine group then a temperature of from about 80° C. to about 120° C. is used and when the modifying compound contains no amine group a temperature of from about 170° C. to about 200° C. is used.

No references cited.

CHARLES B. PARKER, *Primary Examiner.*

A. H. SUTTO, *Assistant Examiner.*